United States Patent [19]

Doughty et al.

[11] Patent Number: 5,063,196
[45] Date of Patent: Nov. 5, 1991

[54] CHROMIUM-FREE IMPREGNATED ACTIVATED CARBON FOR ADSORPTION OF TOXIC GASES AND/OR VAPORS

[75] Inventors: David T. Doughty, Coraopolis; James E. Groose, Mt. Lebanon, both of Pa.

[73] Assignee: Calgon Carbon Corporation, Pittsburgh, Pa.

[21] Appl. No.: 371,430

[22] Filed: Jun. 23, 1989

[51] Int. Cl.$^5$ .................... B01J 20/22; B01J 20/20; B01J 31/28; B01D 53/04
[52] U.S. Cl. ............................. 502/417; 55/68; 55/74; 55/71; 423/236; 423/240; 502/165; 502/167; 502/183; 502/184; 502/401
[58] Field of Search .............. 502/417, 401, 183, 184, 502/167, 150

[56] References Cited

U.S. PATENT DOCUMENTS

| | | | |
|---|---|---|---|
| 1,519,470 | 12/1924 | Wilson | 502/417 |
| 2,523,875 | 9/1950 | Morrell | 252/447 |
| 2,920,051 | 1/1960 | Wiig et al. | 502/417 |
| 2,963,441 | 12/1960 | Dolian | 252/190 |
| 3,251,365 | 5/1966 | Keith | 131/10 |
| 3,355,317 | 11/1967 | Keith | 117/100 |
| 3,460,543 | 8/1969 | Keith et al. | 131/342 |
| 3,605,759 | 9/1971 | Owens | 131/265 |
| 3,618,691 | 11/1971 | Kiefer | 131/266 |
| 3,935,294 | 1/1976 | Teller | 423/226 |
| 4,022,223 | 5/1977 | Rainer | 131/10.9 |
| 4,091,822 | 5/1978 | Ihrig | 131/9 |
| 4,271,133 | 6/1981 | Tellis | 423/230 |
| 4,474,739 | 10/1984 | Zackay | 423/230 |
| 4,531,953 | 7/1985 | Groose | 55/74 |
| 4,594,231 | 6/1986 | Nishino et al. | 502/417 |
| 4,801,311 | 1/1989 | Tolles | 423/236 |
| 4,802,898 | 2/1989 | Tolles | 423/236 |

FOREIGN PATENT DOCUMENTS 149995 8/1973 Czechoslovakia .
1397678 6/1975 United Kingdom .

OTHER PUBLICATIONS

Military Problems with Aerosols and Nonpersistent Gases: Chapter 4: "Impregnation of Charcoal" by Grabenstetter, R. J. and Blacet, F. E.–Division 10 of National Defense Research Committee (1946)–pp. 40–87.

Primary Examiner—Paul E. Konopka
Attorney, Agent, or Firm—Reed Smith Shaw & McClay

[57] ABSTRACT

Impregnated activated carbon adsorbents for the removal of toxic materials from gas streams are used in a variety of respiration and collective filter applications. The activated carbon impregnated adsorbents in the present invention remain effective in removing toxic gases and/or vapors in military, industrial and other applications, and are free of chromium and its potential health hazards. Generally, these activated carbons are comprised of an activated carbon adsorbent impregnated so as to result in an activated carbon containing 0 to 14% copper and 2 to 16% zinc, optionally supplemented according to the desired characteristics with silver, triethylenediamine, and prepared with or without the use of organic acid. The adsorbent carbons of the present invention have been found to be effective for removing a variety of toxic gases and/or vapors. The formulation of the impregnates, the method of impregnation and the method of drying the activated carbon after impregnation taught by the present invention can be varied to adjust the performance characteristics so as to meet both industrial and military toxic gas performance criteria, to achieve enhanced removal of specific toxic gases and/or vapors, to have an extended shelf like, as well as to obtain other advantages useful in respirator and collective filter applications. The impregnated carbon adsorbents in the present invention possess desirable qualities regarding the toxicity and carcinogenicity of the impregnates to the user, qualities that are not found in a large number of prior art impregnates potentially useful in respirator and collective filter applications.

9 Claims, No Drawings 5,063,196

CHROMIUM-FREE IMPREGNATED ACTIVATED CARBON FOR ADSORPTION OF TOXIC GASES AND/OR VAPORS

GOVERNMENT CONTRACT

This invention was made with Government support under Contract DAAA 15-86-C-0030 awarded by the United States Army Chemical Research Development and Engineering Center. The Government has certain limited rights in this invention.

FIELD OF THE INVENTION

The present invention relates to impregnated activated carbon adsorbents for removal of toxic materials in respiration and collective filter applications and, in particular, to a chromium free impregnated carbon adsorbent for the removal of toxic gases and/or vapors.

BACKGROUND OF THE INVENTION

Activated carbon has long been used to remove toxic gases and vapors from a stream of gas. These activated carbons are useful in respirators, collective filters and other applications, and often involved the use of special impregnants to remove gases that would not otherwise be removed through the use of unimpregnated activated carbons. These impregnated activated carbon adsorbents for removal of toxic gases and/or vapors have been known and used for many years. The prior art formulations contain copper, chromium and silver impregnated on an activated carbon. These adsorbents are effective in removing a large number of toxic materials.

Generally, it is known that removal of cyanogen chloride, hydrogen cyanide and cyanogen require the presence of chromium and copper on the activated carbon for effective removal. Copper and silver have been shown to be effective in the removal of arsine and phosphine. Chlorine, hydrogen chloride, hydrogen fluoride and hydrogen sulfide are also removed by the presence of copper impregnates on activated carbon.

In addition to a number of other inorganic materials which have been impregnated on activated carbon, various organic impregnants have been found useful in military applications for the removal of cyanogen chloride. Examples of these include triethylenediamine (TEDA) and pyridine-4-carboxylic acid. Tartaric acid has also been found to be used with other materials in various applications.

A search of the prior art has uncovered patents which disclose a variety of agents impregnated in activated carbon to remove toxic vapors from a gas stream.

British patent No. 2,187,725 discloses activated charcoal impregnated with transition metal salts preferably consisting of cobalt, nickel or zinc acetate.

U.S. Pat. No. 3,355,317 to Keith et al. discloses the use of the oxides of cobalt, copper, zinc, iron and molybdenum on an activated carbon to remove hydrogen cyanide from tobacco smoke.

U.S. Pat. Nos. 2,920,050 and 2,920,051 both to Blacet et al. describe the preparation of whetlerite type filters which include copper, chromium, silver and molybdenum impregnants.

U.S. Pat. No. 4,801,311 to Tolles discloses a whetlerite type activated carbon filter material impregnated with copper, silver, and molybdenum and/or vanadium salts together with triethylenediamine.

U.S. Pat. No. 4,802,898 to Tolles discloses a whetlerite type activated carbon filter material impregnated with triethylenediamine, and optionally with copper and silver.

U.S. Pat. No. 4,531,953 to Groose discloses an activated carbon impregnated with copper, silver and/or chromium mixtures and triethylenediamine.

In addition to the foregoing prior art patents, other references disclose that activated carbon impregnated with triethylenediamine (TEDA) has been found to be particularly effective for gas masks for removing cyanogen chloride, without the need for chromium. References also disclose that activated carbon may be impregnated with copper and/or silver for removal of additional toxic gases or vapors often required for military protective mask applications.

Other references, including the 1946 NDRC report by Grabenstetter et al. describe the use of copper, silver, chromium and molybdenum or vanadium impregnants on activated carbon to remove hydrogen cyanide and cyanogen chloride. Other organic base impregnations of charcoal are disclosed, including the use of amines such as diethylene triamine and others are also found in prior art.

The use of impregnated activated carbon adsorbents in respirators and collective filters, either for military or industrial applications, require special considerations regarding the toxicity and carcinogenicity of the impregnants to the user. These considerations eliminate a large number of prior art potential impregnants from use in respirator and collective filter applications. This is especially the case with hexavalent chromium, which involves potential health hazards.

Accordingly, it is an object of the present invention to provide an activated carbon that has the advantages of a chromium-free adsorbent while remaining effective in removing toxic gases and/or vapors through the impregnation of the activated carbon adsorbent with copper and zinc. It is a further object of the invention to provide an activated carbon absorbent for use in both military and industrial respirator and collective filter applications.

SUMMARY OF THE INVENTION

Generally, the present invention comprises an activated carbon adsorbent impregnated to contain, depending on the particular characteristics desired, a final composition by weight containing a mixture 6-16% total copper and zinc, within the range of 0% to 14% copper and 2% to 16% zinc. Silver, triethylenediamine, and/or tartaric acid may or may not be required, depending on the desired application.

Specific embodiments of the present invention comprise an activated carbon adsorbent impregnated so as to result in a composition containing from about 6% to 8% copper, 6% to 8% zinc, and optionally 0.03% to 0.05% silver and/or 2% to 4% triethylenediamine. Zero to 10% tartaric acid may also be added during preparation of this composition. The adsorbent of this embodiment of the present invention has been found to be effective for removing gases and/or vapors including chlorine, hydrogen chloride, hydrogen cyanide, cyanogen, cyanogen chloride, sulfur dioxide, hydrogen sulfide, formaldehyde and others, which are hereinafter referred to as "toxic gases and/or vapors".

The present invention is useful in respirator and collective filter applications, and meets both military and industrial toxic gas and/or vapor performance criteria. The formulation of the impregnants can be varied to adjust the performance characteristics to achieve the desired enhanced removal of specific toxic gases and/or vapors and extended shelf life. Other advantages of the present invention will become apparent from the following detailed description of the presently preferred embodiments of impregnant compositions.

PRESENTLY PREFERRED EMBODIMENTS

General Preparation Conditions

Samples were impregnated by the "addition-titration" method where solution is slowly added nearly to the point that the activated carbon appears wet. In this method, the pore volume is almost filled with solution. Other methods of impregnation can also be utilized. One or two impregnation "cycles" can be used; sample metal loadings are calculated based on preparation conditions, not actual analysis. Samples are then checked by nitric acid extraction and atomic absorption analysis.

The calculated loadings are typically accurate to about +/−0.5% weight. Samples tested herein have been dried in a forced air draft convection oven on shallow trays. Other methods of drying the activated carbon (including at elevated temperatures in N2) can also be employed, again according to the desired characteristics of the activated carbon. The drying temperatures used vary, and include the methods as provided in the specific data below.

ASZ-TEDA Composition

Preparation

The samples were prepared in batches of approximately 1 Kg and dried in a laboratory oven. The composition of a typical impregnation solution used is shown in Table I. As used herein, ASZ refers to activated carbon impregnated with copper, zinc and optionally silver. ASZ-TEDA refers to the same formulation additionally impregnated with TEDA as set forth in Table I.

TABLE I

| Sample Impregnation Solution for Preparation of ASZ | |
|---|---|
| Material | Quantity* |
| 250 ml | H$_2$O |
| 100 g | (NH$_4$)$_2$CO$_3$ |
| 250 ml | NH$_4$OH (conc.) |
| 72.0 g | ZnCO$_3$ |
| 68.2 g | CuCO$_3$Cu(OH)$_2$ (Basic Copper Carbonate) |
| 0.5 g | AgNO$_3$ |
| 50 g | Tartaric Acid (Optional) |

*Quantities are based on 500 g coal-based activated carbon, 12 × 30 mesh.

Two impregnation cycles were generally used. The first impregnation solution was added to dry coal-based activated carbon in approximately 25 ml aliquots at the ratio of 70 ml per 100 g activated carbon. The activated carbon was shaken during addition to avoid pooling of the solution. The partially impregnated activated carbon was then dried in thin beds in a forced air convection oven for 30 min. at 100° C., and 30 min. at 130° C. After cooling, the activated carbon was reimpregnated with approximately 55 ml solution per 100 g activated carbon in a similar manner. The drying profile used for the twice impregnated product was: 100° C., 30 min; 130° C., 30 min; 160° C., 45 min; 180° C., 45 min. The cooled activated carbon was impregnated with TEDA according to the method of U.S. Pat. No. 4,531,953. Addition of tartaric acid to the impregnation solution gives additional improvement in the HCN performance of the activated carbon.

Testing

The results of hydrogen cyanide, cyanogen chloride and aging tests of a test sample of ASZ-TEDA and a production sample of ASC (prior art chromium impregnated activated carbon) are shown in Table II.

TABLE II

| Hydrogen Cyanide and Cyanogen Chloride Testing Of ASC and ASZ-TEDA Samples | | | | | | | | |
|---|---|---|---|---|---|---|---|---|
| | Hydrogen Cyanide Life (min)[1] | | | | Cyanogen Chloride Life (min) | | | |
| SAMPLE[2] | AR/6 | AR/50 | 50/50 | AGED[3] 80/50 | AR/20 | 50/50 | 80/80 | AGED[3] 80/80 |
| ASZ/4% TEDA | 32 | 30 | 33 | 30 | 32 | 57 | 58 | 57 |
| ASC | 33 | 33 | 39 | 36 | 75 | 94 | 69 | 46 |

[1]The Hydrogen Cyanide life (breakthrough time) test is sensitive to the presence of either Hydrogen Cyanide or Cyanogen.
[2]Test conditions are referred to as (Precondition Humidity)/(Test Humidity). "AR" means sample tested as received.
[3]"Aged" means sample maintained for 7 days at 45° C., 85% relative humidity.

The hydrogen cyanide and cyanogen test results in Table II indicate that performance is relatively insensitive to humidity. The test lives are also comparable to the ASC sample used as a reference. The cyanogen chloride performance of ASZ-TEDA is quite dependent on humidity. Test life is relatively low under dry conditions, and increases as moisture is added to the system during preconditioning. This behavior is different than that of ASC. ASC has better dry performance, reaches peak lifetime at 50/50 conditions, and decreases as more water is added. At 80/80 conditions, cyanogen chloride life of ASZ-TEDA is only slightly lower than ASC.

The most striking improvement in performance between ASZ-TEDA over ASC is that cyanogen chloride performance of ASZ-TEDA does not deteriorate with aging at 45° C. and 85% relative humidity. The ASC reference lost 33% of its effectiveness under these same conditions.

The results of physical property tests and chemical analysis of the product are shown in Table III.

TABLE III

| Physical Properties of an ASZ-TEDA Sample | | |
|---|---|---|
| | Predicted | Analyzed |
| Cu | 6.0% | 6.4% |
| Zn | 6.0 | 5.5 |
| Ag | 0.05 | 0.06 |
| TEDA | 4.0 | ND |
| Moisture | ND | 2.52% |
| Apparent Density | ND | .590 g/ml |

*ND means "not determined."

Tartaric Acid

As shown in Table IV, incorporation of up to 10% tartaric acid in the solution used to impregnate the product resulted in noticeable improvement in the hydrogen cyanide and cyanogen life of the adsorbent of the present invention.

TABLE IV
Effect of Tartaric Acid on Hydrogen Cyanide and Cyanogen Performance of Cu—Zn Samples

| Cu (%) | Zn (%) | Tartaric Acid (%)* | TEDA (%) | Final Drying Temp (°C.) | Hydrogen Cyanide Life (min) | Cyanogen Chloride Life (min) |
|---|---|---|---|---|---|---|
| 8 | 6 | 0 | 4 | 180 | 23 | 52 |
| 8 | 6 | 5 | 4 | 180 | 27 | ND |
| 8 | 6 | 10 | 4 | 180 | 32 | 56 |
| 8 | 6 | 0 | 4 | 220 | 22 | 51 |
| 8 | 6 | 10 | 4 | 220 | 30 | 56 |
| 6 | 6 | 0 | 4 | 180 | 26 | 60 |
| 6 | 6 | 10 | 4 | 180 | 29 | 56 |
| 6 | 6 | 0 | 2 | 180 | 24 | 46 |
| 6 | 6 | 5 | 2 | 180 | 26 | 42 |

*During processing and drying, tartaric acid decomposes; as such, its presence may or may not be detectable in the final product.

The improvements that result from the addition of tartaric acid are most noticeable at higher metal loadings for adsorbents impregnated with 8% Cu and 6% Zn. For these adsorbents, hydrogen cyanide, cyanogen life increased from 21-23 minutes to 28-32 minutes. (Table IV). The improvement in performance for adsorbents containing 6% Cu and 6% Zn was not as marked; in this case, performance improved from 24-26 minutes to 28 minutes. At both the 6% and 8% Cu levels, little effect on cyanogen chloride life was found. Performance improvements with less than 10% tartaric acid were less dramatic.

Adsorbents of the present invention were prepared using other organic acids to improve performance. However, as shown in Table V, only maleic acid indicated any benefit for hydrogen cyanide, cyanogen performance.

TABLE V
Test Lives of Adsorbents with Organic Acids
ASZ samples: 8% Cu, 6% Zn, 0.05% Ag, 4% TEDA and 10% of indicated acid, if added.

| Acid | Hydrogen Cyanide Life (min) | Cyanogen Chloride Life (min) |
|---|---|---|
| Salicylic | 21 | 29 |
| Acetic | 24 | 33 |
| Maleic | 30 | 40 |
| Potassium Hydrogen Phthalic | 20 | 38 |
| (Without Acid) | 23 | 52 |

With respect to maleic acid, the degree of improvement was similar to that found for tartaric acid. Cyanogen chloride performance of the adsorbent prepared with maleic acid was lower than for adsorbent containing tartaric acid.

To understand the response of hydrogen cyanide, cyanogen and cyanogen chloride to variations in the compositional impregnant regions of 0-12% An, and 0-6% TEDA, tests were performed in these ranges. The results of these tests are set forth in Table VI.

TABLE VI
Copper, Zinc and TEDA Formulation Data[1]

| Cu(%) | Zn(%) | TEDA(%) | Life (min.) Cyanogen Chloride[2] | Life (min.) Hydrogen Cyanide[3] |
|---|---|---|---|---|
| 4.00 | 8.00 | 1.500 | 50.00 | 16.00 |
| 0.00 | 8.00 | 4.500 | 62.50 | 18.50 |
| 12.00 | 0.00 | 3.000 | 50.50 | 18.50 |
| 4.00 | 8.00 | 3.000 | 56.50 | 16.50 |
| 8.00 | 0.00 | 1.500 | 20.00 | 16.00 |
| 0.00 | 12.00 | 1.500 | 33.50 | 16.50 |
| 0.00 | 8.00 | 3.000 | 48.50 | 24.00 |
| 0.00 | 8.00 | 1.500 | 45.50 | 16.50 |
| 8.00 | 0.00 | 3.000 | 45.00 | 19.50 |
| 0.00 | 12.00 | 3.000 | 50.00 | 22.00 |
| 12.00 | 0.00 | 1.500 | 35.00 | 17.00 |
| 8.00 | 0.00 | 4.500 | 57.80 | 17.50 |
| 0.00 | 11.25 | 3.800 | 47.00 | 15.50 |
| 4.00 | 8.00 | 3.000 | 50.00 | 19.50 |
| 0.0 | 4.00 | 0.000 | 3.30 | 12.00 |
| 4.00 | 4.00 | 3.000 | 52.50 | 19.50 |
| 0.00 | 0.00 | 3.000 | 14.50 | 2.00 |
| 4.00 | 0.00 | 0.000 | 4.60 | 11.50 |
| 8.00 | 0.00 | 0.000 | 0.40 | 13.60 |
| 0.00 | 4.00 | 0.000 | 3.00 | 14.50 |
| 4.00 | 4.00 | 0.000 | 0.70 | 22.70 |
| 0.00 | 0.00 | 3.000 | 20.70 | 2.60 |
| 4.00 | 0.00 | 3.000 | 36.20 | ND |
| 8.00 | 0.00 | 3.000 | 51.10 | 12.20 |
| 0.00 | 8.00 | 3.000 | 39.80 | 17.50 |
| 0.00 | 0.00 | 1.500 | 17.40 | ND |
| 0.00 | 0.00 | 6.000 | 23.90 | ND |
| 9.70 | 0.00 | 0.000 | 0.00 | 15.50 |
| 9.70 | 0.00 | 3.000 | 43.60 | ND |
| 4.00 | 4.00 | 3.000 | 46.50 | 20.40 |
| 4.00 | 8.00 | 3.000 | 56.00 | 16.00 |
| 4.00 | 6.00 | 4.000 | 68.00 | 24.00 |
| 5.00 | 7.00 | 3.000 | 52.00 | 22.00 |
| 3.00 | 5.00 | 3.000 | 52.00 | 17.00 |
| 3.00 | 7.00 | 5.000 | 60.00 | 16.00 |
| 4.00 | 4.00 | 3.000 | 60.00 | 18.00 |
| 4.00 | 6.00 | 4.000 | 61.00 | 21.00 |
| 4.00 | 0.00 | 1.500 | ND | 7.00 |
| 4.00 | 0.00 | 3.000 | 38.00 | 12.00 |
| 8.00 | 4.00 | 3.000 | 71.00 | 28.00 |
| 12.00 | 0.00 | 1.500 | 37.00 | 18.00 |
| 12.00 | 0.00 | 3.000 | 56.00 | 18.00 |
| 5.00 | 5.00 | 5.000 | ND | 25.00 |
| 4.00 | 6.00 | 4.000 | 70.00 | 25.00 |
| 0.00 | 0.00 | 3.000 | 14.00 | 4.00 |
| 0.00 | 0.00 | 6.000 | 20.00 | 6.00 |
| 8.00 | 8.00 | 3.000 | 65.00 | 26.00 |
| 0.00 | 0.00 | 3.000 | ND | 10.00 |
| 0.00 | 10.00 | 4.000 | 64.00 | 20.00 |
| 6.00 | 0.00 | 2.250 | 38.00 | 18.00 |
| 5.00 | 5.00 | 3.000 | 59.00 | 26.00 |

[1]Silver was not included in these formulations, as it has no effect on the performance of the samples tested on cyanogen chloride and hydrogen cyanide life.
[2]Error limits for Cyanogen Chloride life are ±5 minutes.
[3]Error limits for Hydrogen Cyanide life are ±3 minutes.

It has been found that the major contributor to cyanogen chloride life is TEDA in conjunction with copper and zinc. Interactions between copper and TEDA and zinc and TEDA are important, and contribute significantly in improving performance at higher metal levels.

Hydrogen cyanide/cyanogen protection is provided by copper and zinc, with zinc being more effective at lower metal levels.

While presently preferred embodiments of the invention have been described in particularity, the invention may be otherwise embodied within the scope of the appended claims.

Specific Application AZ Compositions

Preparation and Testing

As used herein, AZ refers to copper and zinc impregnated activated carbon formulations prepared in the same manner as the ASZ-TEDA (Cu-Zn-Ag-TEDA) composition described in Table I, but without the addition of Ag or TEDA. AZ samples were also prepared in the same manner as the aforementioned ASZ-TEDA (Cu-En-Ag-TEDA) composition as described in Table I, but again without the addition of Ag or TEDA, which are often not required for non-military toxic gas and/or vapor applications.

The AZ embodiments of the present invention are comprised of an activated carbon adsorbent impregnated with (depending on the particular characteristics desired) compositions resulting in a metals content of 0% to 14% copper and 2% to 16% zinc in the impregnated activated carbon. The formulations of the impregnants are varied, and demonstrate the that the performance characteristics of the chromium-free compositions in the present invention can be tailored to achieve enhanced removal of specific toxic gases.

Table VII sets forth the results of sample gas life challenges of Chlorine, Hydrogen Chlorine, Sulfur Dioxide, Formaldehyde and Hydrogen Sulfide for a typical AZ formulation.

TABLE VII

Sample Gas Life Challenge Results for AZ Activated Carbons

| | NIOSH $Cl_2$ (min)* | NIOSH HCl (min)* | NIOSH $SO_2$ (min)* | Formaldehyde** (100 ppm/min) | Calgon $H_2S$ Capacity (wt. %) |
|---|---|---|---|---|---|
| ASC | >120 | >120 | 117 | >120, >120 | 7.4 |
| AZ (5% Cu, 6% Zn) | >120 | >120 | 102 | >120, 79 | 8.0 |

*NIOSH Test conditions are 32 L.P.M. per sample cartridge, 12 × 30 screen mesh size, 1 ppm breakthrough, 25° C., 50% humidity.
**Two (2) test cycles were run.

Table VIII sets forth the results of tests on various AZ activated carbon formulations challenged with sulfur dioxide.

TABLE VIII $SO_2$ Challenge Results for AZ Activated Carbons

| Cu (wt %) | Zn (wt %) | $SO_2$ Life (min.) |
|---|---|---|
| 4 | 4 | 72 |
| 4 | 8 | 75 |
| 6 | 6 | 74 |
| 8 | 4 | 78 |
| 8 | 8 | 82 |
| 7 | 0 | 56 |

Conclusions

Laboratory studies show that well-balanced performance in all critical areas is attained with the present invention composition containing from 6-8% Cu, 6-8% Zn, 0.03-0.05% Ag and 2-4% TEDA. When this composition is used, the impregnated activated carbon meets all current military specification tests for ASC Whetlerite. In addition, hydrogen cyanide, cyanogen and cyanogen chloride performance did not deteriorate under tropical aging conditions.

Laboratory studies also show that good performance is attained in all critical areas with the present invention in specialized compositions containing a mixture of 0% to 14% copper and 2% to 16% zinc. Silver and/or triethylenediamine may also be added, depending on desired performance characteristics. Tartaric, maleic and/or other organic acids may also be incorporated into the preparation to improve performance. These compositions can be tailored within the described boundaries to meet specific desired performance characteristics for any number of industrial, military and other needs.

What is claimed:

1. An impregnated activated carbon adsorbent impregnated with at least one solution so as to provide a composition of, by total elemental weight including said activated carbon, from about 4 to 14% copper and 2 to 12% zinc, from 0 to 10% silver and from about 1.5 to 6% triethylenediamine.

2. An impregnated activated carbon adsorbent as set forth in claim 1, wherein said copper is present in an amount of from 5 to 8%, and said zinc is present in an amount of about 5 to 8%.

3. An impregnated activated carbon adsorbent as set forth in claim 1, wherein said copper is present in an amount of from about 6 to 8%, said zinc is present in an amount of about 6 to 8%, said silver is present in an amount of about 0.03 to 0.05% and said triethylenediamine is present in an amount of about 2 to 4%.

4. An impregnated activated carbon adsorbent as set forth in claims 1, 2 or 3, also impregnated so as to include up to 10% organic acid.

5. An impregnated activated carbon adsorbent as set forth in claims 1, 2 or 3, also impregnated so as to include up to 10% of at least one organic acid selected from the group of maleic and tartaric acid.

6. An impregnated activated carbon adsorbent as set forth in claims 1, 2 or 3, wherein at least one solution including 0 to 10% organic acid and said copper, zinc and silver is used to impregnate the activated carbon with said organic acid, copper, zinc, and silver, and wherein the activated carbon is dried after each impregnation, and thereafter impregnated with said triethylenediamine.

7. An impregnated activated carbon adsorbent as set forth in claims 1, 2 or 3, wherein at least one solution including 0 to 10% organic acid and said copper, zinc and is used to impregnate the activated carbon with said organic acid, copper, zinc, and silver, and wherein the activated carbon is dried after each impregnation by heating said activated carbon at up to ignition temperature, and thereafter impregnated with said triethylenediamine.

8. A method of preparation of an impregnated activated carbon adsorbent as set forth in claims 1, 2, or 3, using at least one solution so as to provide said copper, zinc and silver, said solution additionally impregnating said activated carbon with 0 to 10% organic acid, wherein the activated carbon is dried after each impregnation, and thereafter impregnating said activated carbon with said triethylenediamine.

9. A method of preparation of an impregnated activated carbon adsorbent as set forth in claims 1, 2, or 3, using at least one solution so as to provide said copper, zinc and silver, said solution additionally impregnating said activated carbon with 0 to 10% organic acid, wherein the activated carbon is dried after each impregnation by heating said activated carbon at up to ignition temperature, and thereafter impregnating said activated carbon with said triethylenediamine.

* * * * *